US010830958B2

(12) United States Patent
Hosokawa et al.

(10) Patent No.: US 10,830,958 B2
(45) Date of Patent: Nov. 10, 2020

(54) OPTICAL CONNECTOR AND METHOD OF PRODUCING OPTICAL CONNECTOR

(71) Applicant: SUMITOMO ELECTRIC INDUSTRIES, LTD., Osaka (JP)

(72) Inventors: Takako Hosokawa, Osaka (JP); Takuro Watanabe, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 16/519,146

(22) Filed: Jul. 23, 2019

(65) Prior Publication Data
US 2020/0049898 A1 Feb. 13, 2020

(30) Foreign Application Priority Data

Aug. 8, 2018 (JP) .................................. 2018-149727

(51) Int. Cl.
*G02B 6/36* (2006.01)
*G02B 6/38* (2006.01)
(52) U.S. Cl.
CPC ......... *G02B 6/3821* (2013.01); *G02B 6/3833* (2013.01)
(58) Field of Classification Search
CPC .. G02B 6/3821; G02B 6/3833; G02B 6/3885; G02B 6/387
See application file for complete search history.

(56) References Cited

U.S. PATENT DOCUMENTS

| 8,651,749 | B2* | 2/2014 | Dainese J nior | G02B 6/3869 385/74 |
| 9,599,778 | B2* | 3/2017 | Wong | G02B 6/3893 |
| 2012/0141072 | A1* | 6/2012 | Katagiyama | G02B 6/3885 385/72 |
| 2015/0205056 | A1* | 7/2015 | Lin | G02B 6/4416 385/76 |
| 2015/0286012 | A1* | 10/2015 | Irwin | G02B 6/3825 385/56 |
| 2015/0355417 | A1* | 12/2015 | Takano | G02B 6/387 385/60 |
| 2017/0212312 | A1* | 7/2017 | Tong | G02B 6/3849 |
| 2019/0011643 | A1 | 1/2019 | Otomitsu | |

FOREIGN PATENT DOCUMENTS

JP 2010-224195 A 10/2010
JP 2017-151396 A 8/2017

* cited by examiner

*Primary Examiner* — Ellen E Kim
(74) *Attorney, Agent, or Firm* — Faegre Drinker Biddle & Reath LLP

(57) ABSTRACT

An optical connector according to an embodiment includes: an optical fiber extending along a connecting direction; a front housing in a tubular shape including a first opening and a second opening; a ferrule configured to retain the optical fibers and having a light incidence-emission part optically connected to a corresponding connector; a pin keeper configured to retain a guide pin inserted into the ferrule; and a rear housing fixed with the second opening covered and configured to support the coil spring in the inside of the front housing. The rear housing has an insertion hole into which the optical fiber is insertable from a direction intersecting with the connecting direction.

8 Claims, 18 Drawing Sheets

OPTICAL CONNECTOR AND METHOD OF PRODUCING OPTICAL CONNECTOR

TECHNICAL FIELD

The present disclosure relates to an optical connector and a method of producing an optical connector.

BACKGROUND

Japanese Unexamined Patent Publication No. 2017-151396 describes an optical fiber-equipped optical connector and a method of producing the same. This optical connector is a multiple-fiber connector installed at one end portion of a plurality of coated optical fibers. From each of the plurality of coated optical fiber, a plurality of optical fiber strands extends. The multiple-fiber connector includes a ferrule to which the end portions of the optical fiber strands are fixed, a front housing that houses the ferrule, a rear housing into which the optical fiber strands are inserted, and a tube housing installed on the rear housing on the opposite side of the ferrule. The front housing, the rear housing, and the tube housing are arranged along in the connecting direction of the multiple-fiber connector. On the rear housing, a spring that spring-biases the ferrule on the front side is provided.

SUMMARY

An optical connector according to an aspect of the present disclosure includes: an optical fiber extending along a connecting direction; a housing in a tubular shape, the housing including a first opening and a second opening directed to one side and another side in the connecting direction; a ferrule configured to retain the optical fiber, the ferrule having a light incidence-emission part optically coupled to a corresponding connector; a pin keeper configured to retain a guide pin to be inserted into the ferrule; an elastic body configured to press the ferrule together with the pin keeper along the connecting direction; and a support member fixed with the second opening covered, the support member being configured to support the elastic body in an inside of the housing. The support member has an insertion hole into which the optical fiber is insertable from an intersecting direction intersecting with the connecting direction. In the inside of the housing, the ferrule, the pin keeper, and the elastic body are movably disposed in turn from the first opening to the second opening in the connecting direction. The light incidence-emission part is exposed from the first opening. The optical fiber extends from the insertion hole of the support member covering the second opening.

A method of producing an optical connector according to an aspect of the present disclosure that is a method of producing the above-described optical connector, the method including: a first process of mounting the optical fiber on the ferrule; and a second process of inserting the optical fiber into the insertion hole of the support member. The second process is performed after the first process.

DETAILED DESCRIPTION

Figure 1:
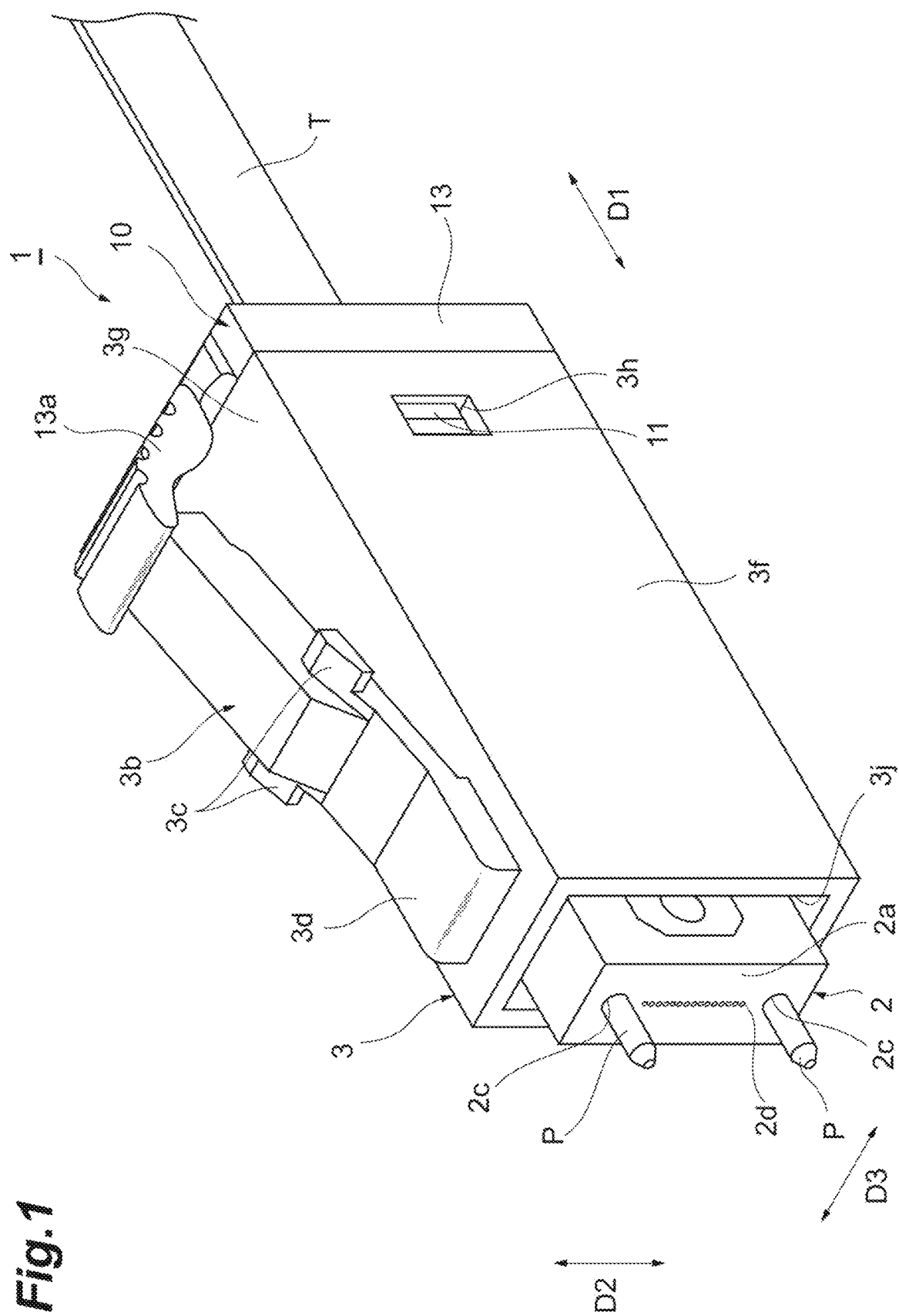
FIG. 1 is a perspective view showing an optical connector according to a first embodiment.

In the optical connector described in Japanese Unexamined Patent Publication No. 2017-151396, the rear housing has a tubular shape including an insertion hole into which the optical fiber strands are inserted. The spring that spring-biases the ferrule on the front side has a spiral shape, and the optical fiber strands are inserted into the inside of the spring. Therefore, in the assembly of the optical connector, the optical fiber strands have to be fixed to the ferrule after the optical fiber strands are inserted into the spring and the rear housing.

The ferrule is provided at the both ends of the optical fiber strands. Therefore, after the ferrule is fixed to the both ends of the optical fiber strands inserted into the rear housing and the spring, the removal of the rear housing and the spring is difficult. That is, in the case in which the rear housing, the spring, or the optical fiber strand is installed in a wrong orientation or a wrong type of the rear housing, the spring, or the optical fiber strand is installed, under present circumstances, the rear housing or the spring cannot be removed unless the optical fiber is cut. As described above, a problem possibly arises in that easy assembly and removal of the components of the optical connector fail.

An object of an aspect of the present disclosure is to provide an optical connector and a method of producing an optical connector that can easily assemble and remove components.

According to an aspect of the present disclosure, the assembly and removal of components can be easily performed.

Description of an Embodiment of the Disclosure of the Present Application

First, the content of an embodiment of the disclosure of the present application will be described in list. An optical connector according to an embodiment includes: an optical fiber extending along a connecting direction; a housing in a tubular shape, the housing including a first opening and a second opening directed to one side and another side in the connecting direction; a ferrule configured to retain the optical fiber, the ferrule having a light incidence-emission part optically coupled to a corresponding connector; a pin keeper configured to retain a guide pin to be inserted into the ferrule; an elastic body configured to press the ferrule along the connecting direction together with the pin keeper; and a support member fixed with the second opening covered, the support member being configured to support the elastic body in the inside of the housing. The support member has an insertion hole into which the optical fiber is insertable from an intersecting direction intersecting with the connecting direction. In the inside of the housing, the ferrule, the pin keeper, and the elastic body are movably disposed in the connecting direction in turn from the first opening to the second opening. The light incidence-emission part is exposed from the first opening. The optical fiber extends from the insertion hole of the support member covering the second opening.

The optical connector according to the embodiment includes the support member fixed with the second opening of the housing covered, and the support member is configured to support the elastic body in the inside of the housing. The support member has the insertion hole into which the optical fiber is insertable from the intersecting direction intersecting with the connecting direction. The optical fiber is insertable into the insertion hole of the support member from the intersecting direction, and hence the insertion and removal of the optical fiber into and from the insertion hole can be easily performed. Therefore, in the assembly of the optical connector, the optical fiber can be fixed to the ferrule before the optical fiber is inserted into the support member, and the optical fiber can be fixed to the ferrule after the optical fiber is inserted into the support member. Thus, the timing of fixing the optical fiber to the ferrule can be changed, and hence the assembly of the optical connector can be easily performed. Even though the ferrule is fixed to the both ends of the optical fiber inserted into the support member, the optical fiber can be removed from the insertion hole of the support member in the intersecting direction, and hence the removal of the optical fiber from the support member can be easily performed. Therefore, even in the case in which the support member or the optical fiber is installed in a wrong orientation or a wrong type of the support member or the optical fiber is installed, the support member can be removed without cutting the optical fiber, and hence the assembly and removal of the components of the optical connector can be easily performed.

The support member may have a cut extending from the outer edge to the insertion hole of the support member. In this case, the insertion and extraction of the optical fiber can be performed through the cut, and hence the assembly and removal of the optical fiber with and from the support member can be easily performed.

The support member is configured of one component, and may have a hinge configured to open and close the cut. In this case, the support member is configured of one component, and hence the costs of the support member can be reduced. The size of the cut can be freely changed by the hinge, and hence the insertion and removal of the optical fiber into and from the support member can be more easily performed.

The support member may have an engagement part configured to keep the cut closed. In this case, the cut is closed by the engagement part, and hence the cut can be closed with the optical fiber inserted into the insertion hole. Therefore, the possibility that the optical fiber unintentionally comes off from the insertion hole can be reduced.

The support member is splittable into a plurality of components, and the plurality of components may individually have the engagement part configured to engage the plurality of components with each other. In this case, the support member is splittable into a plurality of components, the optical fiber can be inserted into the insertion hole with the support member split into the plurality of components, and hence this further contributes to improving assemblability.

The elastic body may be a plurality of coil springs. In this case, the ferrule can be more stably spring-biased with the plurality of coil springs than using one coil spring. That is, the plurality of coil springs presses the ferrule in the connecting direction together with the pin keeper, and hence the pressing force to the ferrule in the connecting direction can be stabilized.

The support member has a plurality of grooves on one side in the connecting direction, and the plurality of coil springs may be individually fit into the plurality of grooves. In this case, the plurality of coil springs is individually fit into the plurality of grooves, and hence even after the optical fiber is fixed to the ferrule, the coil springs can be easily installed on the support member. Therefore, the assembly of the optical connector can be more easily performed. The coil spring is fit into the groove, and hence the coil spring can be installed in the stable state. Therefore, the biasing force to the ferrule by the plurality of coil springs can be further stabilized.

The support member may have a plurality of projections on one side in the connecting direction, and the plurality of coil springs may be individually fit into the plurality of projections. In this case, the plurality of coil springs is individually fit into the plurality of projections, and hence similarly to the description above, the assembly of the optical connector can be more easily performed. The coil spring can be easily installed by being fit into the projection in the stable state as well as the biasing force to the ferrule can be further stabilized.

At least any one of the spring constant and spring length of the plurality of coil springs may be different from each other. In this case, even in the case in which the biasing force to the pin keeper and the ferrule is inclined from the connecting direction in spring-biasing the pin keeper and the ferrule in the connecting direction because the shape of the support member is in asymmetry, at least any one of the spring constant and spring length of the plurality of coil springs is different from each other, and hence the orientation of the biasing force can be adjusted in the connecting direction. Therefore, the biasing force to the ferrule in the connecting direction can be further stabilized.

A method of producing an optical connector according to an embodiment is a method of producing the above-described optical connector. The method includes a first process of mounting the optical fiber on the ferrule, and a second process of inserting the optical fiber into the insertion hole of the support member. The second process is performed after the first process.

In the method of producing an optical connector according to an embodiment, the optical fiber is inserted into the insertion hole of the support member after the optical fiber is mounted on the ferrule. Therefore, regardless of the timing of mounting the optical fiber on the ferrule, the insertion and extraction of the optical fiber into and from the insertion hole can be easily performed. Consequently, the assembly and removal of components can be easily performed.

Detail of Embodiments of the Disclosure of the Present Application

In the following, specific examples of an optical connector and a method of producing an optical connector according to embodiments will be described with reference to the drawings. Note that the present application is not limited to the examples below, and aims to include all modifications in the scope equivalent to claims. In the description of the drawings, the same or corresponding components are designated with the same reference signs, and the duplicate description is appropriately omitted. The drawings are sometimes partially simplified or exaggerated for easy understanding, and dimensions and ratios, for example, are not limited to those described on the drawings.

First Embodiment

Figure 2:
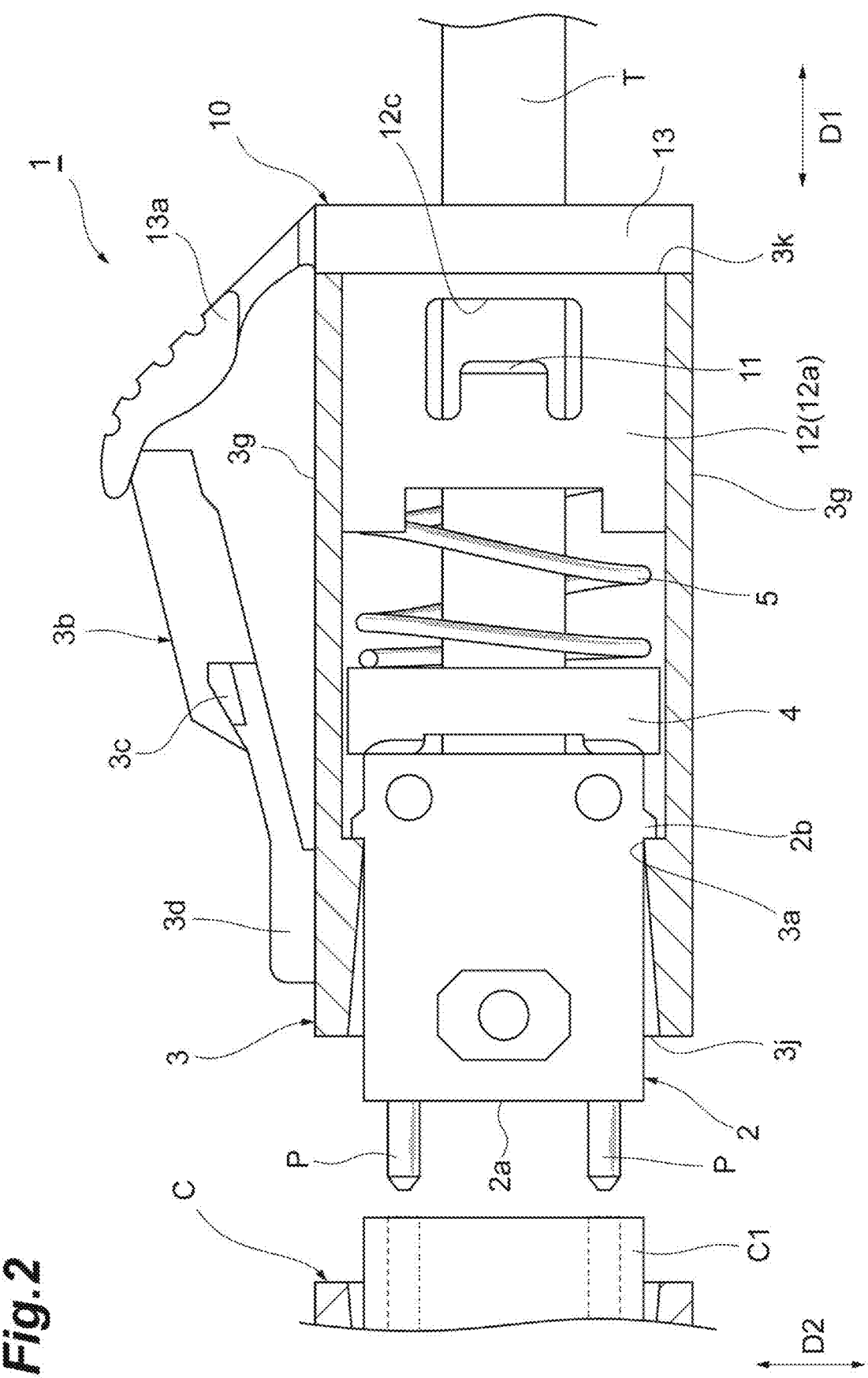
FIG. 2 is a partial cross sectional view showing the internal structure of the optical connector in FIG. 1.

FIG. 1 is a perspective view showing an optical connector according to a first embodiment. FIG. 2 is a partial cross sectional view showing the optical connector according to the first embodiment. As shown in FIGS. 1 and 2, an optical connector 1 according to the first embodiment is an MPO connector, for example, and is a connector connected to a corresponding connector C and an adapter externally provided along a connecting direction D1.

The optical connector 1 includes a ferrule 2 located at one end of the optical connector 1, for example, a front housing 3 (a housing) covering the ferrule 2, a rear housing 10 (a support member) that engages with the front housing 3 on the opposite side of the ferrule 2, and a tape fiber T including optical fibers F (see FIG. 5) extending to the outside of the front housing 3 and the rear housing 10. In the specification, the term "engage" means that a plurality of components or portions engages with each other, including, for example, the case in which a plurality of components or portions is fit into each other, the case in which a plurality of components or portions is joined to each other, and any other case.

In the inside of the optical connector 1, a pin keeper 4 configured to retain a guide pin P to be inserted into the ferrule 2 and a coil spring 5 (an elastic body) configured to spring-bias the ferrule 2 together with the pin keeper 4 are provided. In the following, for convenience of explanation, description is sometimes provided with directions determined as "front" and "rear". In the above-described connecting direction D1, the direction in which the ferrule 2 is viewed from the rear housing 10 is the front (one side), and the opposite direction is the rear (the other side). The direction, which is the direction intersecting with the connecting direction D1, of the long side of a light incidence-emission part 2a that is the end face of the ferrule 2 is a direction D2. The direction of the short side of the light incidence-emission part 2a is a direction D3. These directions are provided simply because of convenience of explanation, and are not limited to the scope of the present application.

The ferrule 2 is in a box shape including an extension part 2b on the rear side. In the inside of the ferrule 2, an optical fiber retaining hole 2d extending in the connecting direction D1 is formed. Into the optical fiber retaining holes 2d, the optical fibers F of the tape fiber T are individually inserted from the rear housing 10 into the inside of the front housing 3. The front end of the extension part 2b of the ferrule 2 is a contact surface that contacts an inner protrusion 3a of the front housing 3.

The light incidence-emission part 2a of the ferrule 2 contacts a ferrule C1 of the corresponding connector C to be connected to the optical connector 1 in the connecting direction D1. The ferrule 2 has a pair of guide holes 2c into which the guide pins P are inserted. The guide pins P and the guide holes 2c function as an alignment part that aligns the corresponding connector C with the optical connector 1. Two guide holes 2c are disposed side by side along the direction D2.

Between the ferrule 2 and the rear housing 10, a coil spring 5 configured to spring-bias the ferrule 2 on the front side and a pin keeper 4 configured to retain the guide pins P to be inserted into the guide holes 2c from the front side are provided. The pin keeper 4 is housed in the inside of the front housing 3, and provided between the ferrule 2 and the coil spring 5. The pin keeper 4 has a pair of retaining holes 4a configured to retain the guide pins P (see FIG. 5), and the pair of retaining holes 4a is provided so as to be arranged in the direction D2. The coil spring 5 spring-biases the ferrule 2 and the pin keeper 4 directed to the corresponding connector C.

The material of the front housing 3 is PC (polycarbonate), for example, and can be appropriately modified. The front housing 3 is in a box shape, for example, including a pair of first side faces 3f extending in both of the connecting direction D1 and the direction D2 and a pair of second side faces 3g extending in both of the connecting direction D1 and the direction D3. The front housing 3 has a first opening 3j on one side (the front side) in the connecting direction D1 from which the ferrule 2 is exposed, and a second opening 3k on the other side in the connecting direction D1 into which the rear housing 10 is fit. The pair of first side faces 3f is flat, for example. On one of the pair of second side faces 3g, a latch 3b configured to engage with the adapter is provided. Therefore, the optical connector 1 has an asymmetry shape.

The latch 3b has a plate shape along the connecting direction D1 and extending diagonally above. The latch 3b includes an engagement part 3c configured to engage with the adapter and a fixing part 3d fixed to the front housing 3. For example, the fixing part 3d and the engagement part 3c are arranged from the front side to the rear side in this order. The front housing 3 is provided with a push-pull mechanism. With the push-pull mechanism, the engagement of the latch 3b with the adapter can be released when the front housing 3 is extracted from the adapter to the rear side.

Specifically, in the push-pull mechanism, the engagement part 3c of the latch 3b is movable in the direction D2 by being bent in the direction D2 as the fixing part 3d is the starting point. Upon sliding the latch 3b to the rear side with the extraction of the front housing 3 from the adapter, the engagement part 3c is pressed downward. Consequently, the latch 3b is entirely pressed downward as well as the engagement of the engagement part 3c with the adapter is released. The extraction of the front housing 3 to the rear side enables the extraction of the optical connector 1 from the adapter.

Figure 3:
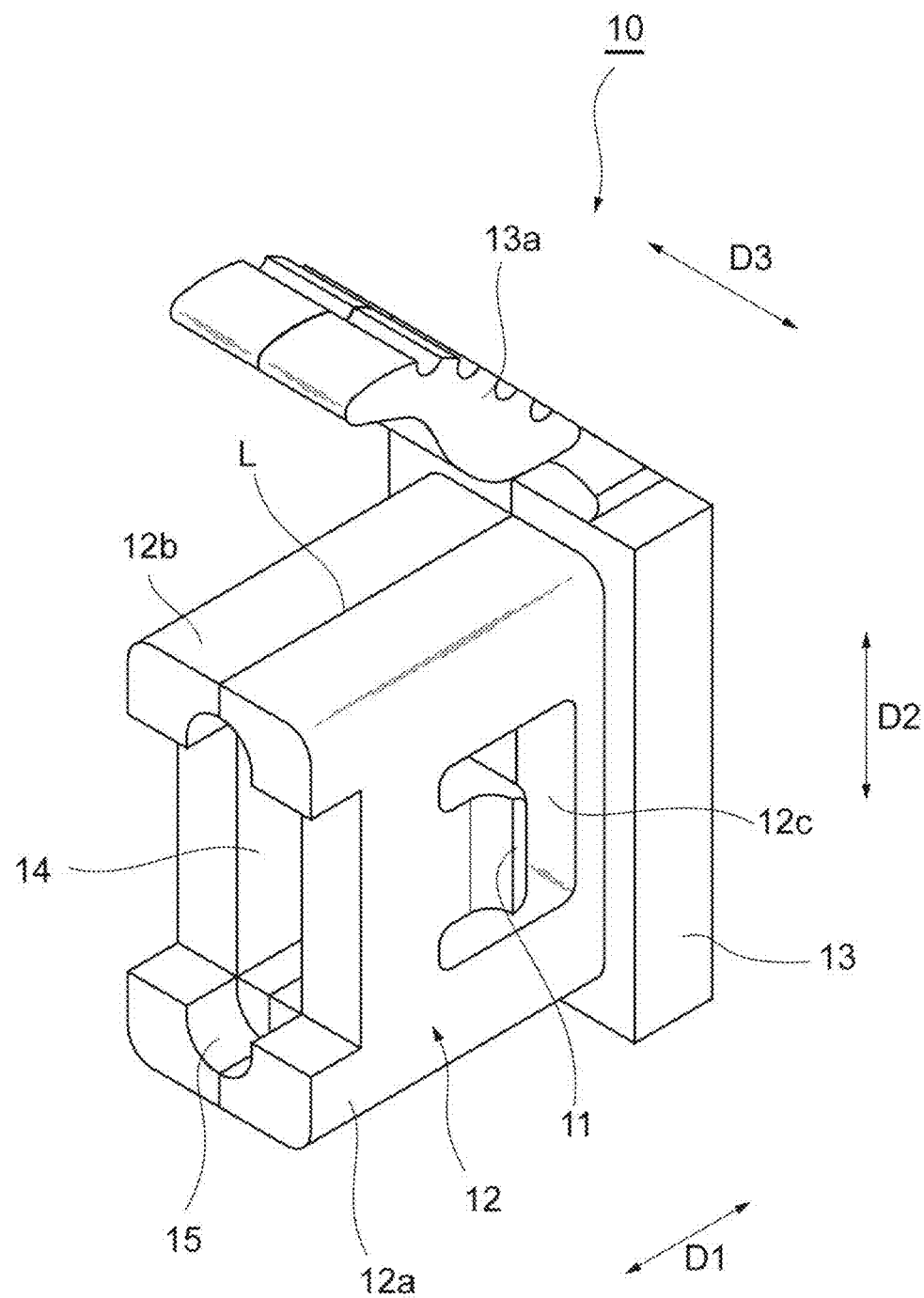
FIG. 3 is a perspective view showing the support member of the optical connector in FIG. 1.

FIG. 3 is a perspective view showing the rear housing 10. The front housing 3 and the rear housing 10 are both made of a resin. As shown in FIGS. 1 and 3, the front housing 3 includes an engagement part 3h configured to engage the rear housing 10 on the first side faces 3f, for example. The engagement part 3h is an engagement hole, as an example, and the engagement part 11 of the rear housing 10 engages with the engagement hole. The rear housing 10 has an inserted part 12 inserted into the inside of the front housing 3, an extension part 13 that expands at the end portion of the inserted part 12 in the connecting direction D1, and an insertion hole 14 penetrating the inserted part 12 and the extension part 13 in the connecting direction D1 and into which the tape fiber T is inserted.

The inserted part 12 has a pair of first side faces 12a directed to the direction D3, for example, and a pair of second side faces 12b directed to the direction D2. The first side face of 12a is provided with the above-described engagement part 11 and a notch 12c surrounding the engagement part 11 from three directions. This notch 12c improves the elasticity of the engagement part 11 in the direction D3. Consequently, the rear housing 10 can firmly engage with the front housing 3.

The rear housing 10 has an elastic body retaining part 15 configured to retain the coil spring 5 on one side in the connecting direction D1. The elastic body retaining part 15 has a recessed-shape, for example, to which the coil spring 5 is entered. The extension part 13 includes a protrusion 13a obliquely protruding toward the latch 3b of the front housing 3. The protrusion 13a functions as the knob of the rear housing 10, for example. The rear housing 10 has an asymmetry shape with the protrusion 13a.

Figure 4:
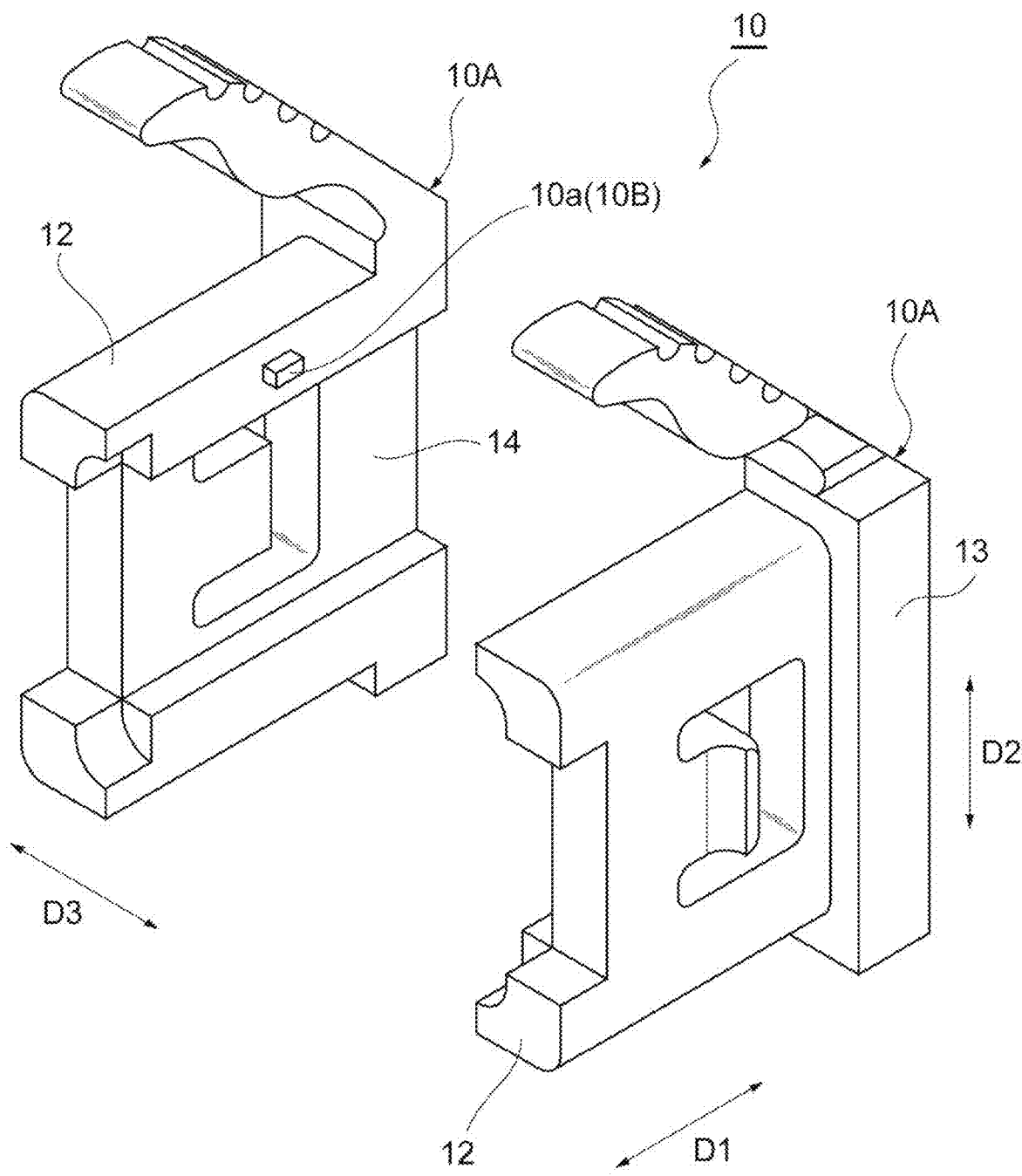
FIG. 4 is an exploded perspective view showing the support member in FIG. 3.

FIG. 4 is a perspective view showing a plurality of split components 10A. As shown in FIGS. 3 and 4, into the insertion hole 14, the optical fibers F (the tape fiber T) are insertable from the direction D2 intersecting with the connecting direction D1. Specifically, the rear housing 10 is splittable into the plurality of components 10A. Between the split components 10A, the optical fibers F (the tape fiber T) are insertable into the insertion hole 14 in the direction D2. As an example, the number of the component 10A is two, and the rear housing 10 is split into two parts as two components 10A.

The rear housing 10 is splittable in the direction D3, for example, at a boundary line L extending in the connecting direction D1 and the direction D2. For example, on one of the plurality of components 10A, a bump 10a is provided, and on the other of the plurality of components 10A, a recess is provided into which the bump 10a is fit. The bump 10a is fit into the recess, and hence the plurality of components 10A is mated with each other to configure the rear housing 10. The recess and the bump 10a configure an engagement part 10B configured to engage the plurality of components 10A with each other.

Figure 5:
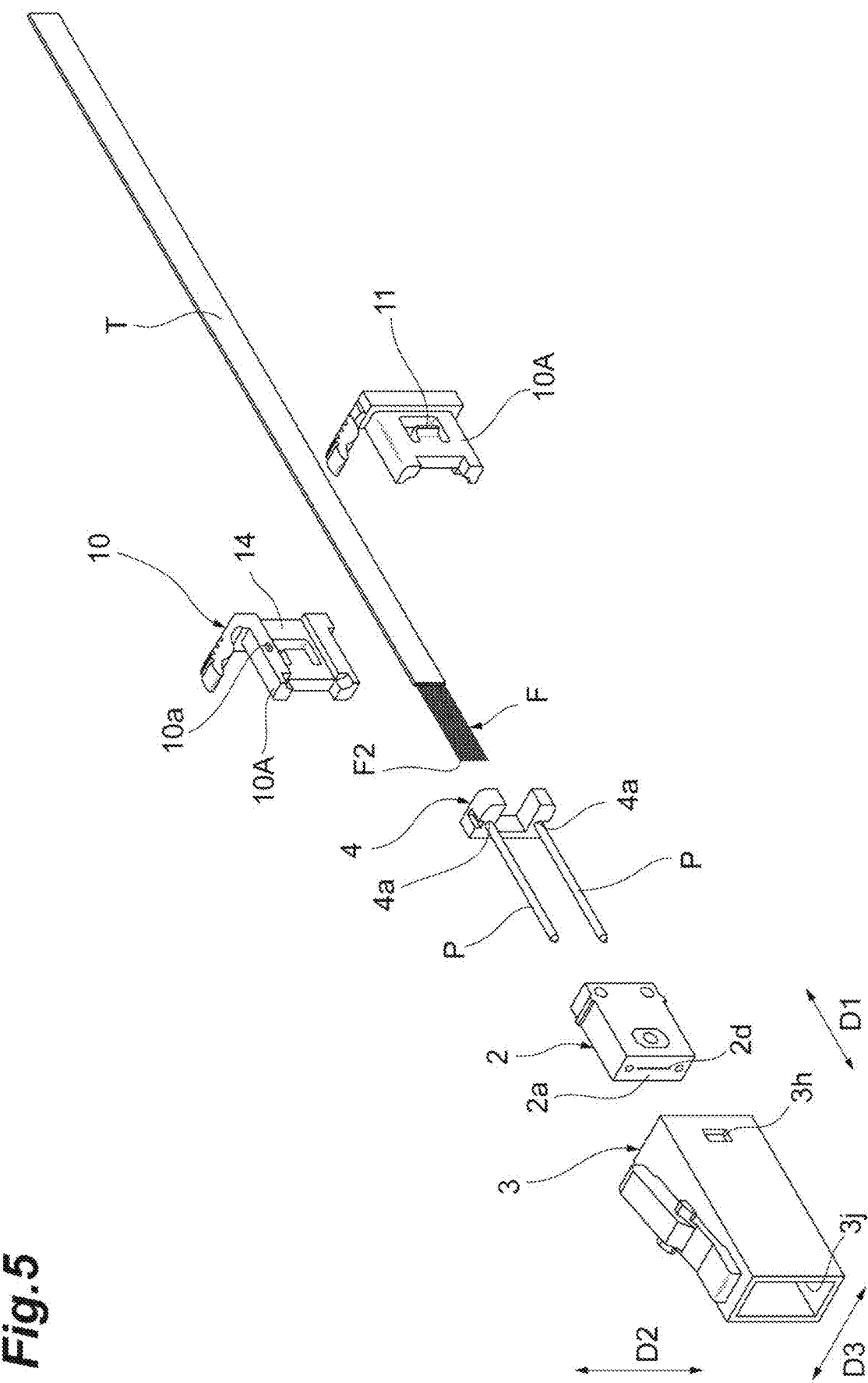
FIG. 5 is an exploded perspective view in the assembly of the optical connector in FIG. 1.

Next, referring to FIGS. 5 and 6, an example of a method of producing an optical connector according to the embodiment will be described. In the following, the procedures of assembly of the optical connector 1 will be described. First, the ferrule 2, the front housing 3, the pin keeper 4, the guide pin P, the tape fiber T, and the rear housing 10 are prepared, and the optical fibers F of the tape fiber T inserted into the coil spring 5, for example, are mounted on the ferrule 2 (a first process). Note that in FIGS. 5 and 6, the coil spring 5 is omitted.

For example, a plurality of optical fibers F extending from the tape fiber T is inserted into the inside of the ferrule 2 from the rear side, and the optical fibers F are fixed to the ferrule 2 with tip end faces F2 of the optical fibers F exposed from the optical fiber retaining holes 2d of the light incidence-emission part 2a. The optical fibers F are fixed to the ferrule 2 with an adhesive, for example, and the adhesive is introduced from the window part of the ferrule 2 into the inside of the ferrule 2.

Figure 6:
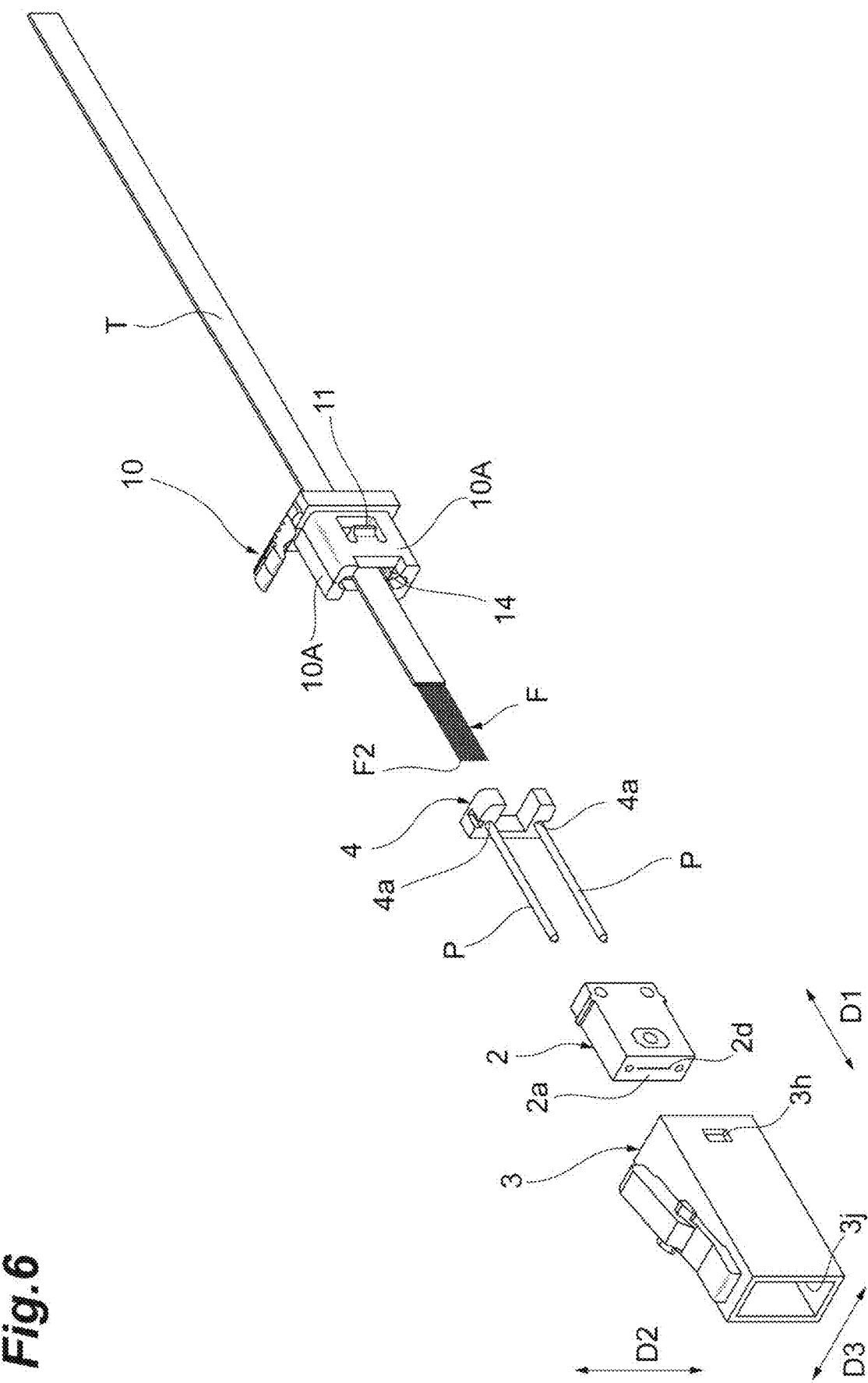
FIG. 6 is an exploded perspective view in the assembly of the optical connector in FIG. 1.

After the optical fibers F are mounted on the ferrule 2, as shown in FIG. 6, for example, the plurality of components 10A is mated with each other from one side and the other side of the tape fiber T in the direction D3, and hence the tape fiber T is inserted into the insertion hole 14 (a second process). The bump 10a is fit into the recess to mate the plurality of components 10A with each other, and then the rear housing 10 is integrated in one piece. After the tape fiber T is attached to the pin keeper 4 retaining the guide pin P inserted into the ferrule 2 in the direction D3, the ferrule 2, the pin keeper 4, the coil spring 5, and the rear housing 10 are inserted into the second opening 3k of the front housing 3 from the rear side to engage the engagement part 11 of the rear housing 10 with the engagement part 3h of the front housing 3, and hence the assembly of the optical connector 1 is completed.

Next, the operation and the effect obtained from the optical connector 1 according to the embodiment and the method of producing the same will be described. The optical connector 1 includes the rear housing 10 fixed with the second opening 3k of the front housing 3 covered, and the rear housing 10 is configured to support the coil spring 5 in the inside of the front housing 3. The rear housing 10 has the insertion hole 14 into which the optical fibers F (the tape fiber T) are insertable from the direction D2 intersecting with the connecting direction D1 (the intersecting direction). Into the insertion hole 14 of the rear housing 10, the optical fibers (the tape fiber T) are insertable from the direction D2, and hence the insertion and removal of the optical fibers F into and from the insertion hole 14 can be easily performed. Therefore, in the assembly of the optical connector 1, the optical fibers F can be fixed to the ferrule 2 before the optical fibers F are inserted into the rear housing 10 as well as the optical fibers F can be fixed to the ferrule 2 after the optical fibers F are inserted into the rear housing 10. Thus, the timing of fixing the optical fibers F to the ferrule 2 can be changed, and hence the assembly of the optical connector 1 can be easily performed.

The optical fibers F can be removed from the insertion hole 14 of the rear housing 10 in the direction D2 even though the ferrule 2 is fixed to the both ends of the optical fibers F inserted into the rear housing 10, and hence the removal of the optical fibers F from the rear housing 10 can be easily performed. Therefore, the optical fibers F can be removed without cutting the rear housing 10 even in the case in which the rear housing 10 or the optical fiber F is installed in a wrong orientation or a wrong type of the rear housing 10 or the optical fiber F is installed, and hence the assembly and removal of components of the optical connector 1 can be easily performed.

The rear housing 10 is splittable into the plurality of components 10A. The plurality of components 10A individually has the engagement part 10B configured to engage the plurality of components 10A with each other. That is, the rear housing 10 is splittable into the plurality of components 10A, the optical fibers F can be inserted into the insertion hole 14 with the plurality of components 10A split, and hence this contributes to improving assemblability.

In the producing method according to the embodiment, the optical fibers F are inserted into the insertion hole 14 of the rear housing 10 after the optical fibers F are mounted on the ferrule 2. Therefore, regardless of the timing of mounting the optical fibers F on the ferrule 2, the insertion and extraction of the optical fibers F into and from the insertion hole 14 can be easily performed. Consequently, the assembly and removal of components can be easily performed.

Second Embodiment

Figure 7:
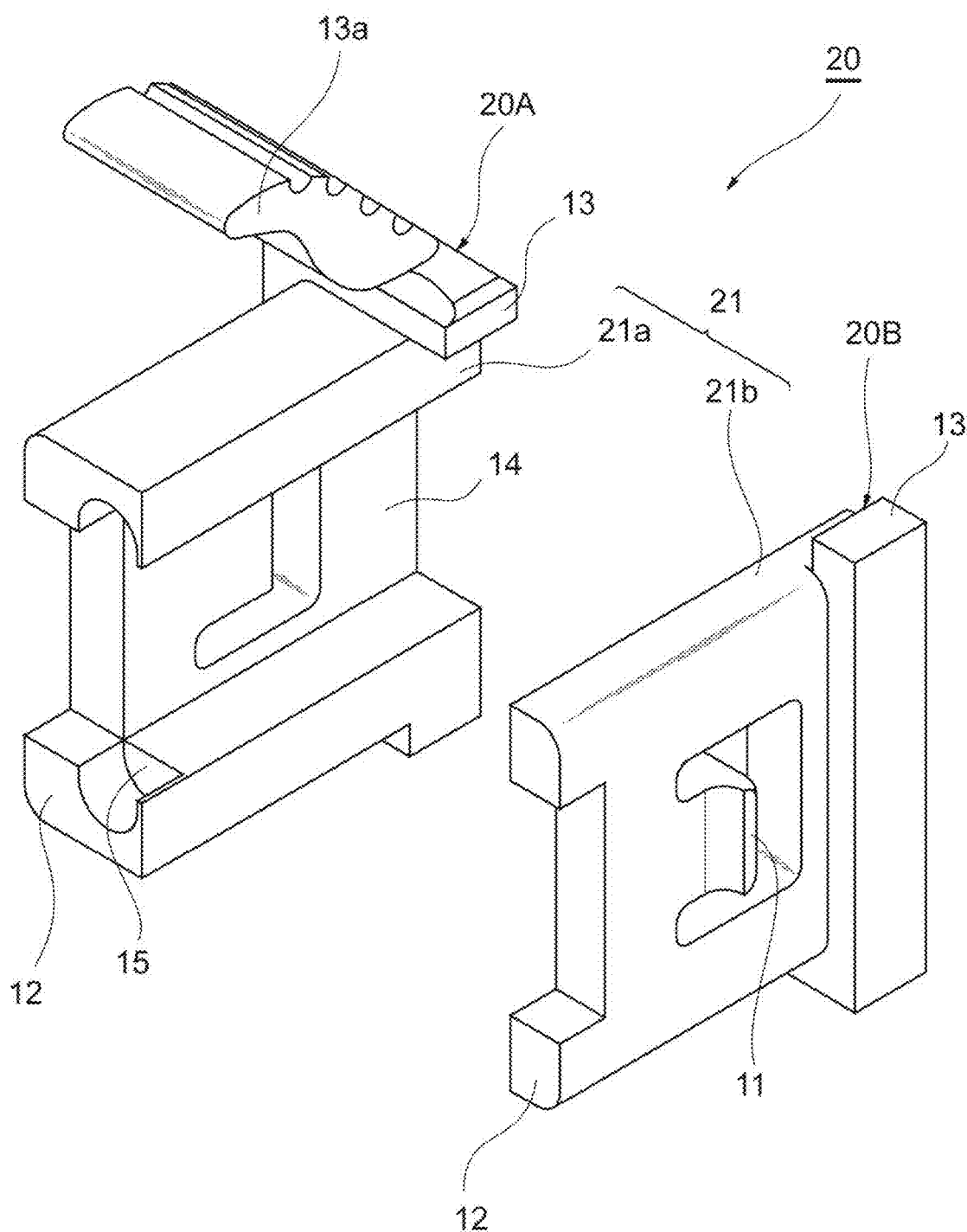
FIG. 7 is a perspective view showing the support member of an optical connector according to a second embodiment.
Figure 8:
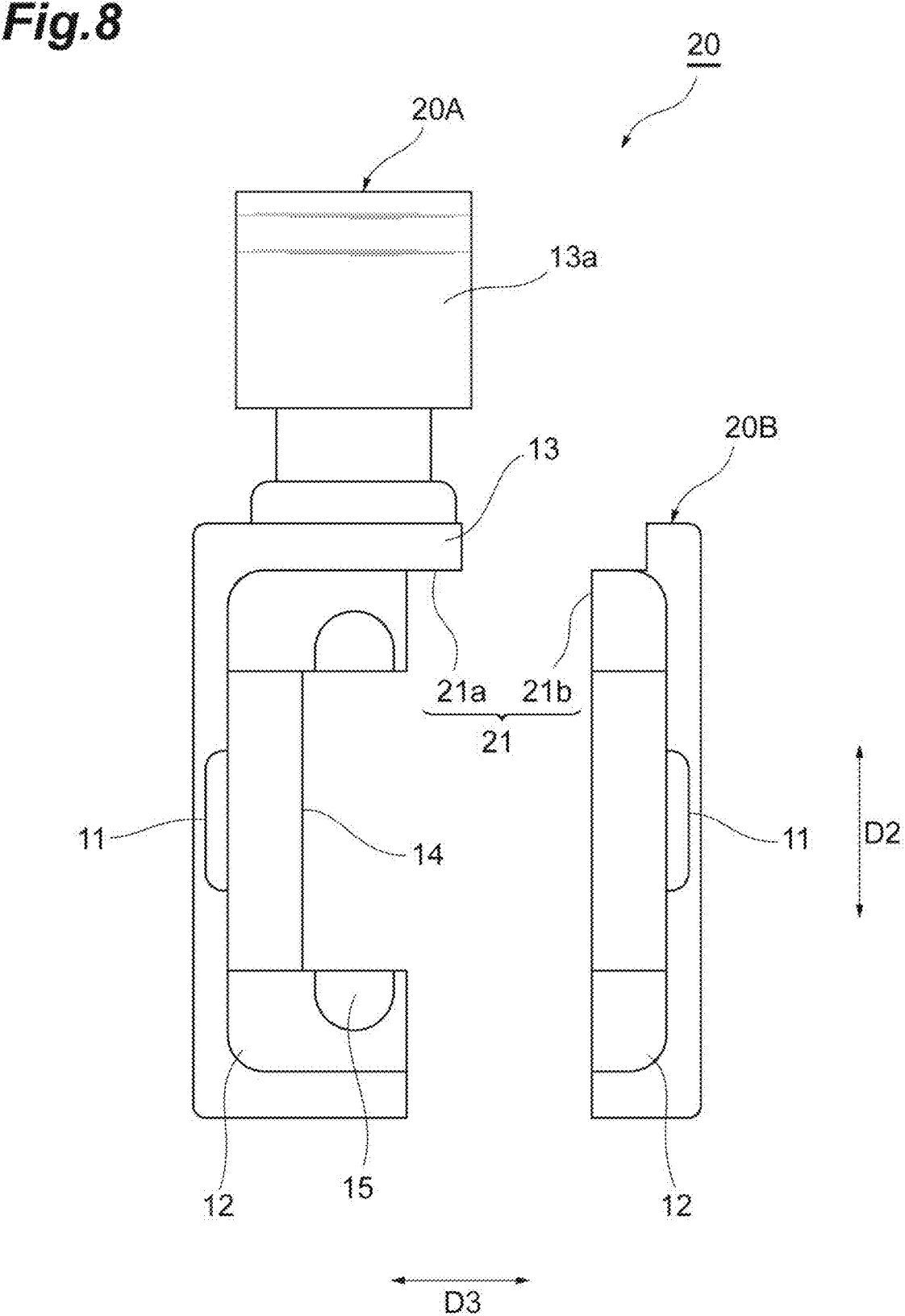
FIG. 8 is a front view showing the support member in FIG. 7.

Next, referring to FIGS. 7 and 8, a rear housing 20 of an optical connector according to a second embodiment will be described. In the following, the duplicate description of the above-described embodiment is appropriately omitted. Similarly to the rear housing 10, the rear housing 20 includes an engagement part 11, an inserted part 12, an extension part 13, an insertion hole 14, and an elastic body retaining part 15. The rear housing 20 includes components 20A and 20B. The component 20A is greater than the component 20B, and the component 20A and the component 20B have an asymmetry shape. That is, unlike the plurality of half-split components 10A described above, the size and shape of the components 20A and 20B are different from each other.

Both of the component 20A and the component 20B have the engagement part 11, the inserted part 12, and the extension part 13. The component 20A has a protrusion 13a, the insertion hole 14, and the elastic body retaining part 15, whereas the component 20B has none of the protrusion 13a, the insertion hole 14, nor the elastic body retaining part 15. The component 20A has a recess 21a that accepts the component 20B. The component 20B has a bump 21b that enters the recess 21a. The recess 21a and the bump 21b configure an engagement part 21 configured to engage the component 20A with the component 20B. For example, the bump 21b is fit into the recess 21a, and hence the rear housing 20 is configured.

As described above, in the optical connector according to the second embodiment, the rear housing 20 is splittable into the components 20A and 20B, and the component 20A and the component 20B have the engagement part 21 configured to engage the component 20A with the component 20B. Therefore, the optical fibers F can be inserted into the insertion hole 14 with the component 20A and the component 20B split, and hence this contributes to improving assemblability. Consequently, the effect similar the first embodiment can be obtained.

Third Embodiment

Figure 9:
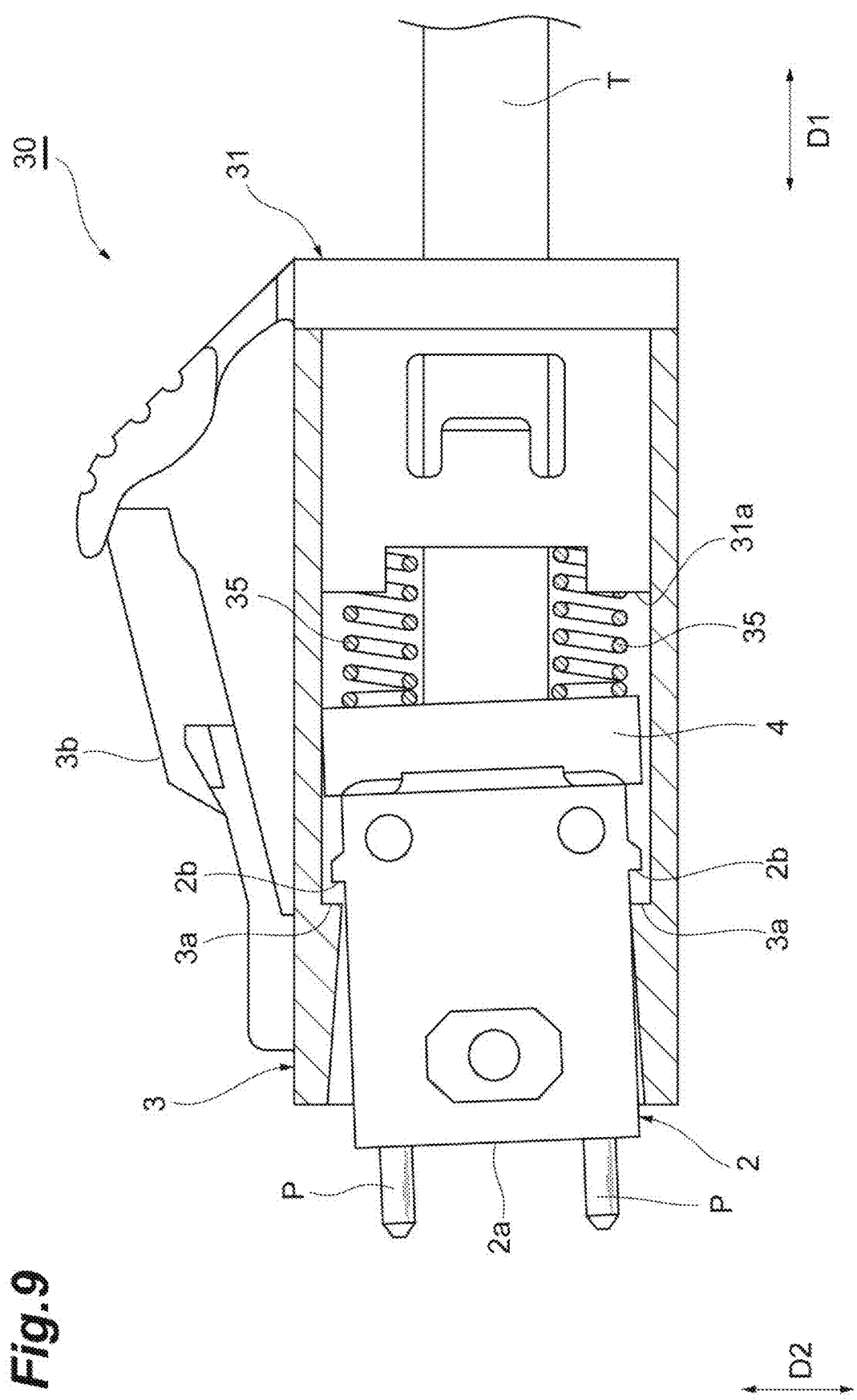
FIG. 9 is a partial cross sectional view showing an exemplary internal structure of an optical connector according to a third embodiment.
Figure 10:
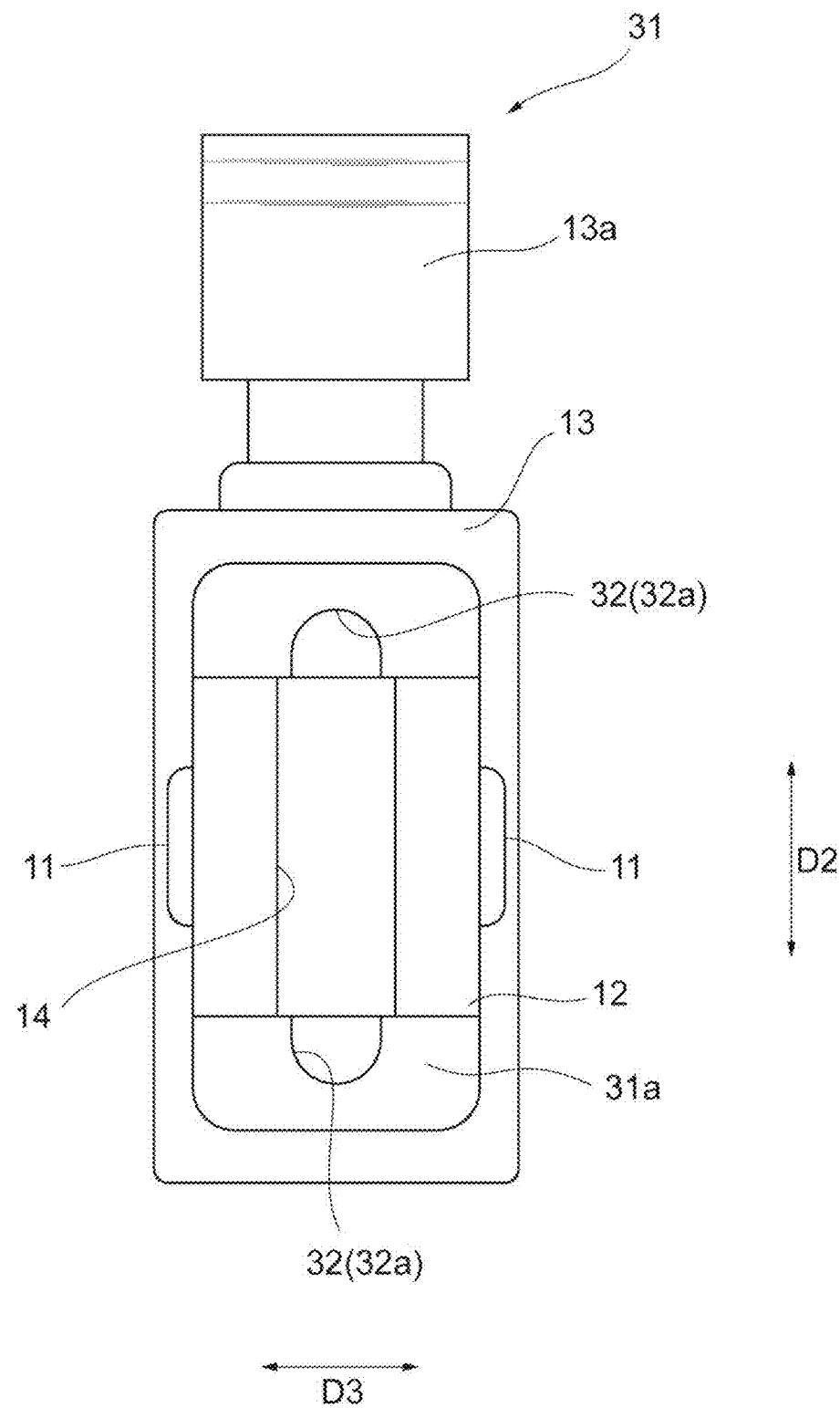
FIG. 10 is a front view showing the support member of the optical connector in FIG. 3.
Figure 11:
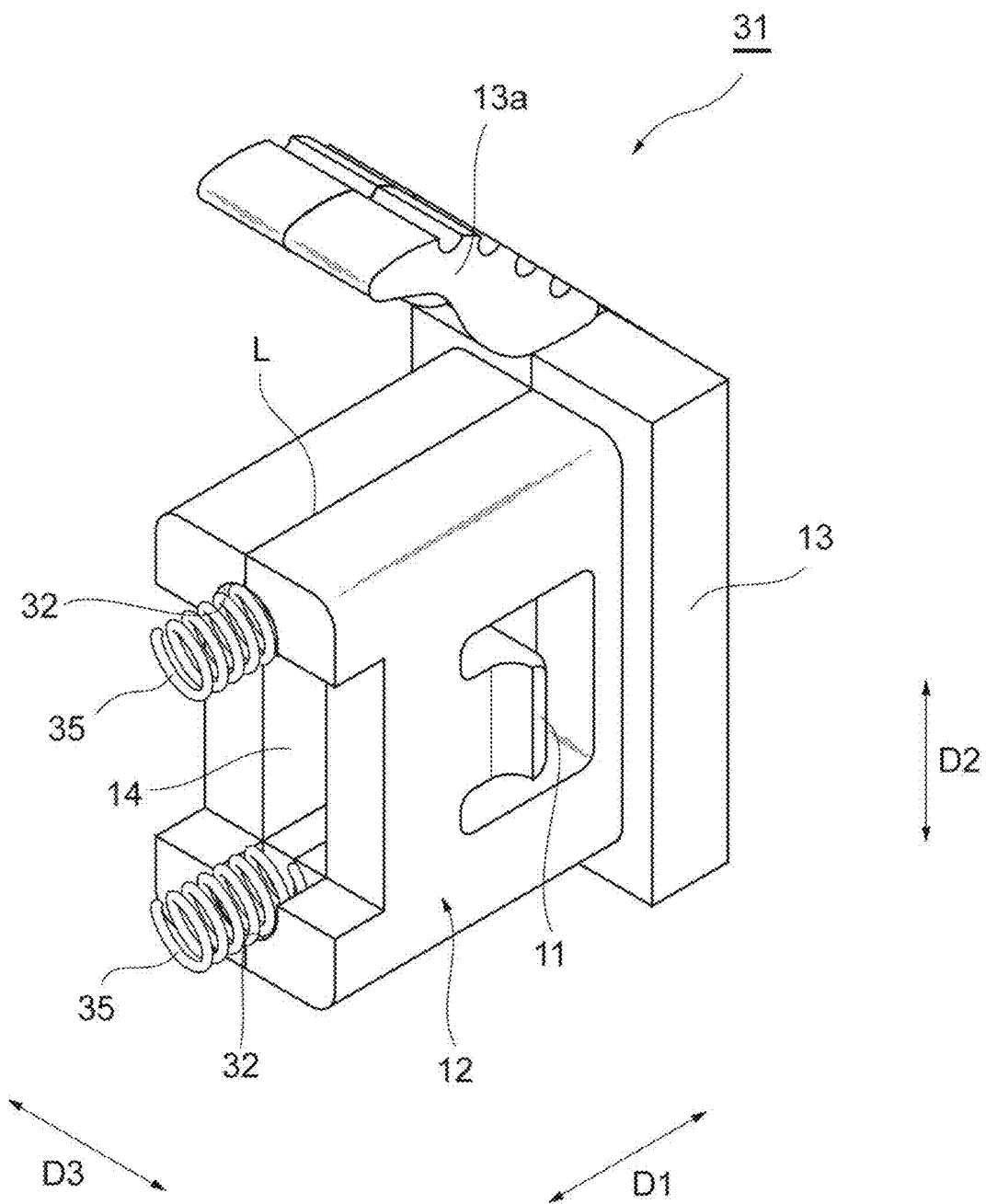
FIG. 11 is a perspective view showing a support member and an elastic body in FIG. 9.

Next, referring to FIGS. 9, 10, and 11, an optical connector according to a third embodiment will be described. An optical connector 30 according to the third embodiment includes a rear housing 31 and a plurality of coil springs 35. Similarly to the optical connector 1 according to the first embodiment, the shape of the optical connector 30 is in asymmetry. The rear housing 31 has grooves 32 that individually accept the plurality of coil springs 35 on a face 31a directed to one side in the connecting direction D1 (the front side, the ferrule 2 side).

The groove 32 is disposed on both sides on the face 31a in the direction D2. For example, the plurality of grooves 32 is disposed at locations at which the plurality of grooves 32 is in symmetry to the center of the face 31a in the direction D2. The grooves 32 have a C-shape (U-shape), for example, and have a curved surface 32a that is an inner surface along the outer edge of the coil spring 35. The groove 32 has a C-shape, and hence the coil spring 35 can be more securely fit into the groove 32. However, the shape and size of the groove 32 can be appropriately modified.

When the optical connector 30 is inserted into an adapter, not shown, and connected to a corresponding optical connector, light incidence-emission parts 2a of a ferrule 2 are pressed against each other, the extension part 2b of the ferrule 2 is separated from an inner protrusion 3a of a front housing 3, and the ferrule 2 moves integrally with the ferrule of the corresponding optical connector, not shown. The ferrule 2 is in a floating state in which connection becomes more stabilized even though an external force is applied to the optical connector 30. At this time, in the case in which the ferrule 2 is in an asymmetry shape where a latch 3b of the optical connector 30 engaging with the adapter, not shown, is provided on one side in the direction D2, for example, the spring constant and the spring length of the plurality of coil springs 35 are the same, it is assumed that the optical connector 30 is inclined to the adapter, not shown, in the connecting direction D1. This inclination might impair connection stability due to the application of an unnecessary force on the ferrule 2 in the floating state. In contrast to this, in the optical connector 30 according to the third embodiment, at least one of the spring constant and the spring length of the plurality of coil springs 35 (the length in the connecting direction D1) may be different from each other. In this case, for example, the spring constant of the coil spring 35 located on one side in the direction D2 is increased more than the spring constant of the coil spring 35 located on the other side in the direction D2, and hence the plurality of coil springs 35 can impart the pressing force along the connecting direction D1 to a pin keeper 4 and the ferrule 2 even though the optical connector 30 is inclined to the adapter, not shown, from the connecting direction D1. The plurality of coil springs 35 may have spring constants different from each other by varying the material or the spring wire thickness of the springs from each other.

As described above, the optical connector 30 according to the third embodiment includes the plurality of coil springs 35, and no tape fiber T is inserted into the coil springs 35. Thus, the coil springs 35 can be attached regardless of the timing of fixing the optical fibers F to the ferrule 2. That is, the coil spring 35 can also be fit into the groove 32 after the optical fibers F of the tape fiber T are mounted on the ferrule 2. Therefore, the assembly of the optical connector 30 can be more easily performed.

In the third embodiment, the elastic body that spring-biases the ferrule 2 is the plurality of coil springs 35. Therefore, the ferrule 2 can be more stably spring-biased by the plurality of coil springs 35 than using one coil spring. That is, the ferrule 2 is pressed by the plurality of coil springs 35 together with the pin keeper 4, and hence the biasing force to the ferrule 2 in the connecting direction D1 can be stabilized.

The rear housing 31 has the plurality of grooves 32 on one side in the connecting direction D1. The plurality of coil springs 35 is individually fit into the plurality of grooves 32. Therefore, the plurality of coil springs 35 is individually fit into the plurality of grooves 32, and hence the coil springs 35 can be installed even after the optical fibers F can be fixed to the ferrule 2. Thus, the assembly of the optical connector 30 can be more easily performed. The coil spring 35 is fit into the groove 32, and hence the coil spring 35 can be installed in the stable state. Accordingly, the biasing force to the ferrule 2 can be stabilized by the coil springs 35.

The plurality of coil springs 35 may have spring constants different from each other. In this case, even in the case in which the biasing force to the pin keeper 4 and the ferrule 2 is inclined from the connecting direction D1 due to the asymmetry shape of the rear housing 31 in the application of spring bias in the connecting direction D1, the plurality of coil springs 35 has spring constants different from each other, and hence the orientation of the biasing force can be adjusted in the connecting direction D1. Therefore, the biasing force to the ferrule 2 can be further stabilized.

Fourth Embodiment

Figure 12:
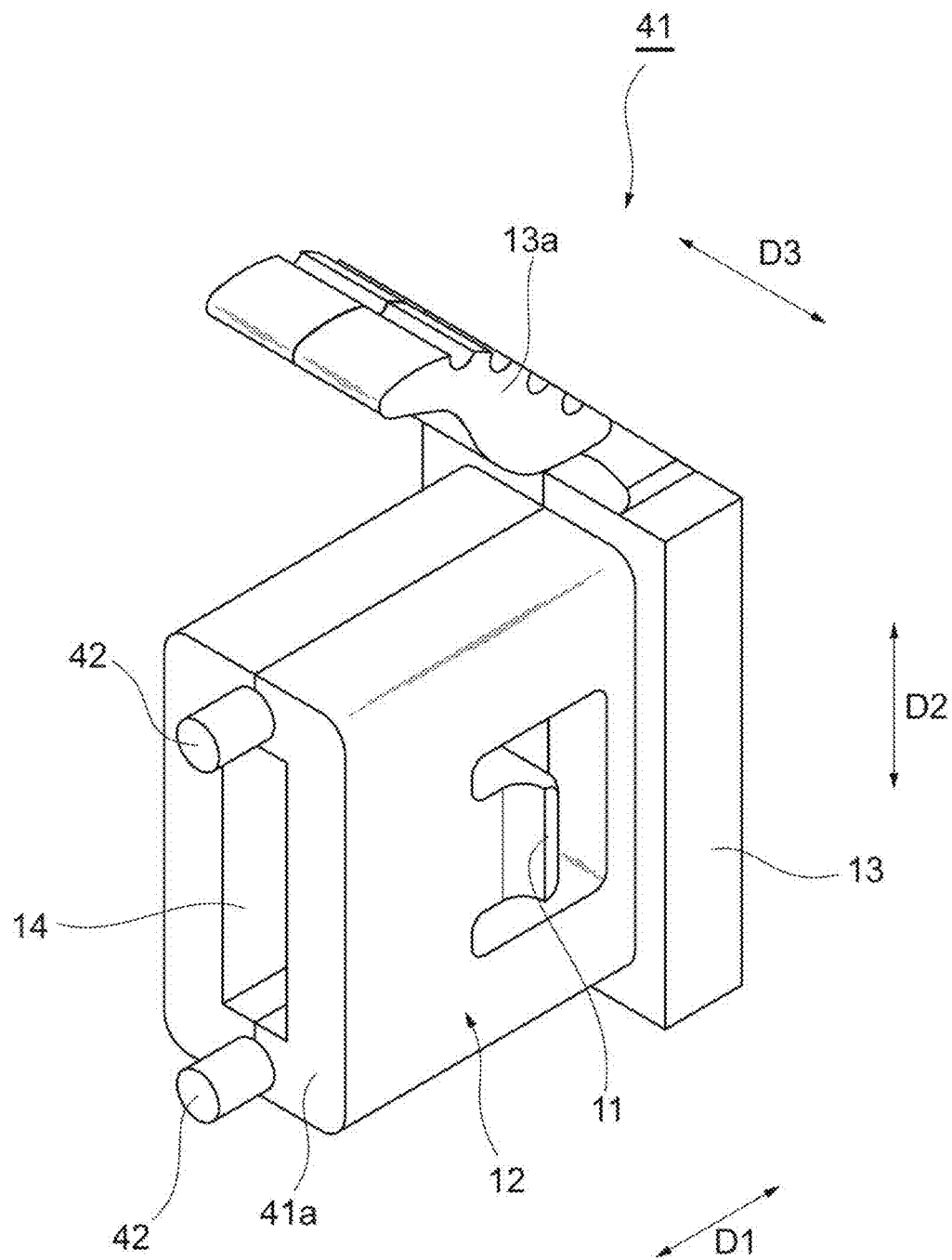
FIG. 12 is a perspective view showing the support member of an optical connector according to a fourth embodiment.
Figure 13:
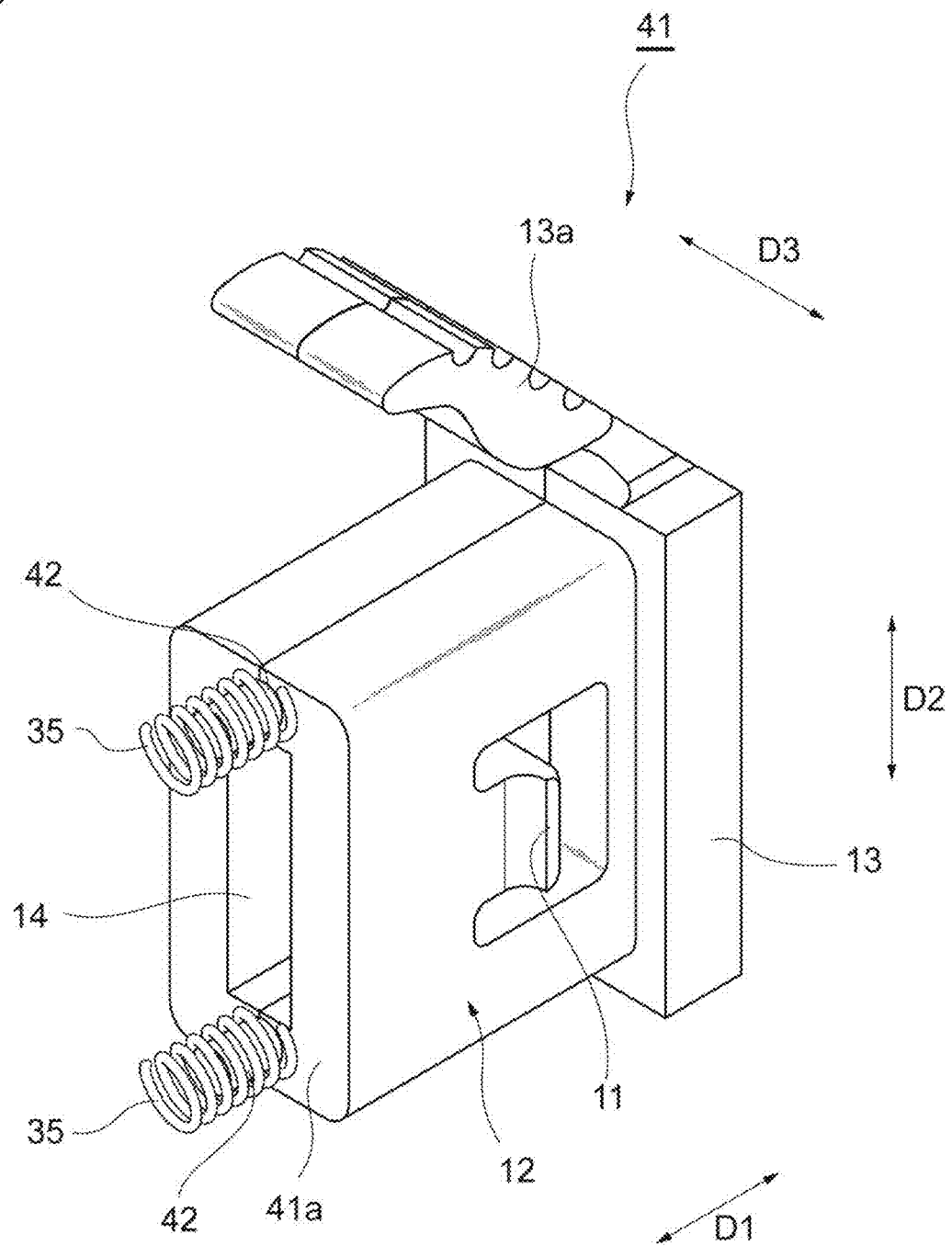
FIG. 13 is a perspective view showing the support member and an elastic body in FIG. 12.

Next, referring to FIGS. 12 and 13, an optical connector according to a fourth embodiment will be described. As shown in FIGS. 12 and 13, the optical connector according to the fourth embodiment includes a rear housing 41 having a projection 42 on which a coil spring 35 is installed. The projection 42 is disposed on both sides in the direction D2 on a face 41a directed to one side of the rear housing 41 in the connecting direction D1. The projections 42 have a columnar shape, for example. The outer diameter of the projection 42 is almost the same as the inner diameter of the coil spring 35. The rear housing 41 includes the projections 42, and hence the coil spring 35 can be more securely fit into the projection 42. Note that the shape and size of the projection 42 can be appropriately modified.

As described above, in the fourth embodiment, the rear housing 41 has the plurality of projections 42 on one side in the connecting direction D1. The plurality of coil springs 35 is individually fit into the plurality of projections 42. Therefore, the plurality of coil springs 35 is individually fit into the plurality of projections 42, and hence similarly to the third embodiment, the assembly of the optical connector can be easily performed. That is, the coil spring 35 can be installed in the stable state by fitting the coil spring 35 into the projection 42, and hence the biasing force to the ferrule 2 can be further stabilized. Note that on one side face of the rear housing in the connecting direction, both of the groove 32 of the third embodiment and the projection 42 protruding from the groove 32 in the connecting direction may be provided.

Fifth Embodiment

Figure 14:
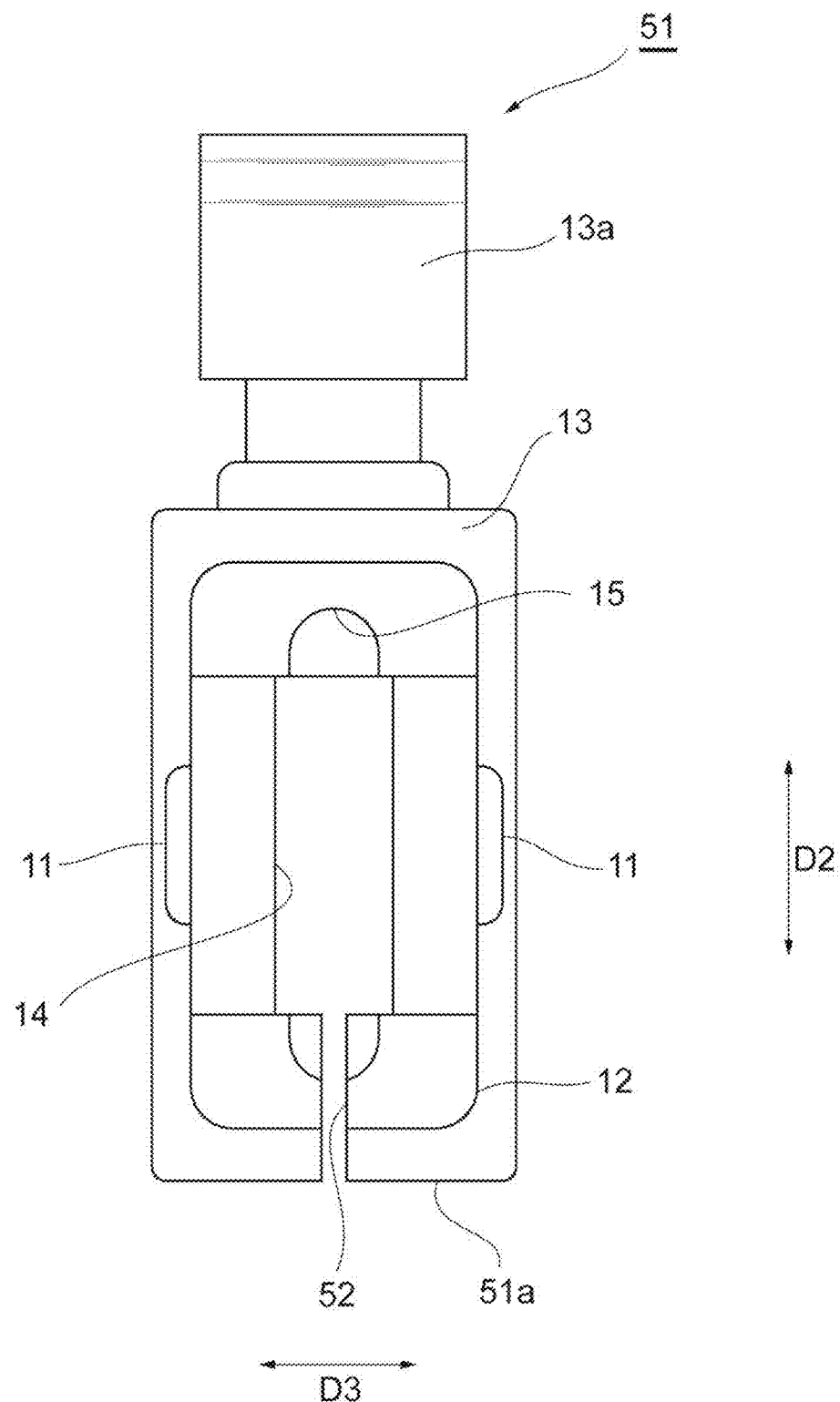
FIG. 14 is a front view showing the support member of an optical connector according to a fifth embodiment.

Next, referring to FIG. 14, an optical connector according to a fifth embodiment will be described. As shown in FIG. 14, the optical connector according to the fifth embodiment includes a rear housing 51. The rear housing 51 is configured of one component. That is, the rear housing 51 is not splittable. Similarly to the above-described rear housing 10, the rear housing 51 includes an engagement part 11, an inserted part 12, an extension part 13, an insertion hole 14, and an elastic body retaining part 15. The rear housing 51 includes a cut 52 extending in the direction intersecting with the connecting direction D1 (e.g. in the direction D2) and communicating with the insertion hole 14.

The cut 52 is a slit configured to insert the optical fibers F (the tape fiber T) into the insertion hole 14. For example, the cut 52 linearly extends from an outer edge 51a of the rear housing 51 to the insertion hole 14. For example, the cut 52 extends from the outer edge 51a located on the opposite side of a protrusion 13a of the rear housing 51 to the insertion hole 14. The width of the cut 52 is slightly greater than the width of the tape fiber T. However, the shape, size, number, and position of the cut 52 can be appropriately modified.

As described above, in the fifth embodiment, the rear housing 51 is configured of one component, having the cut 52 extending from the outer edge 51a of the rear housing 51 to the insertion hole 14. Therefore, the rear housing 51 is configured of one component, and hence the number of components can be reduced as well as the costs can be reduced. The insertion and extraction of the optical fibers F can be performed through the cut 52, and hence the assembly and removal of the optical fibers F with and from the rear housing 51 can be easily performed.

Sixth Embodiment

Figure 15:
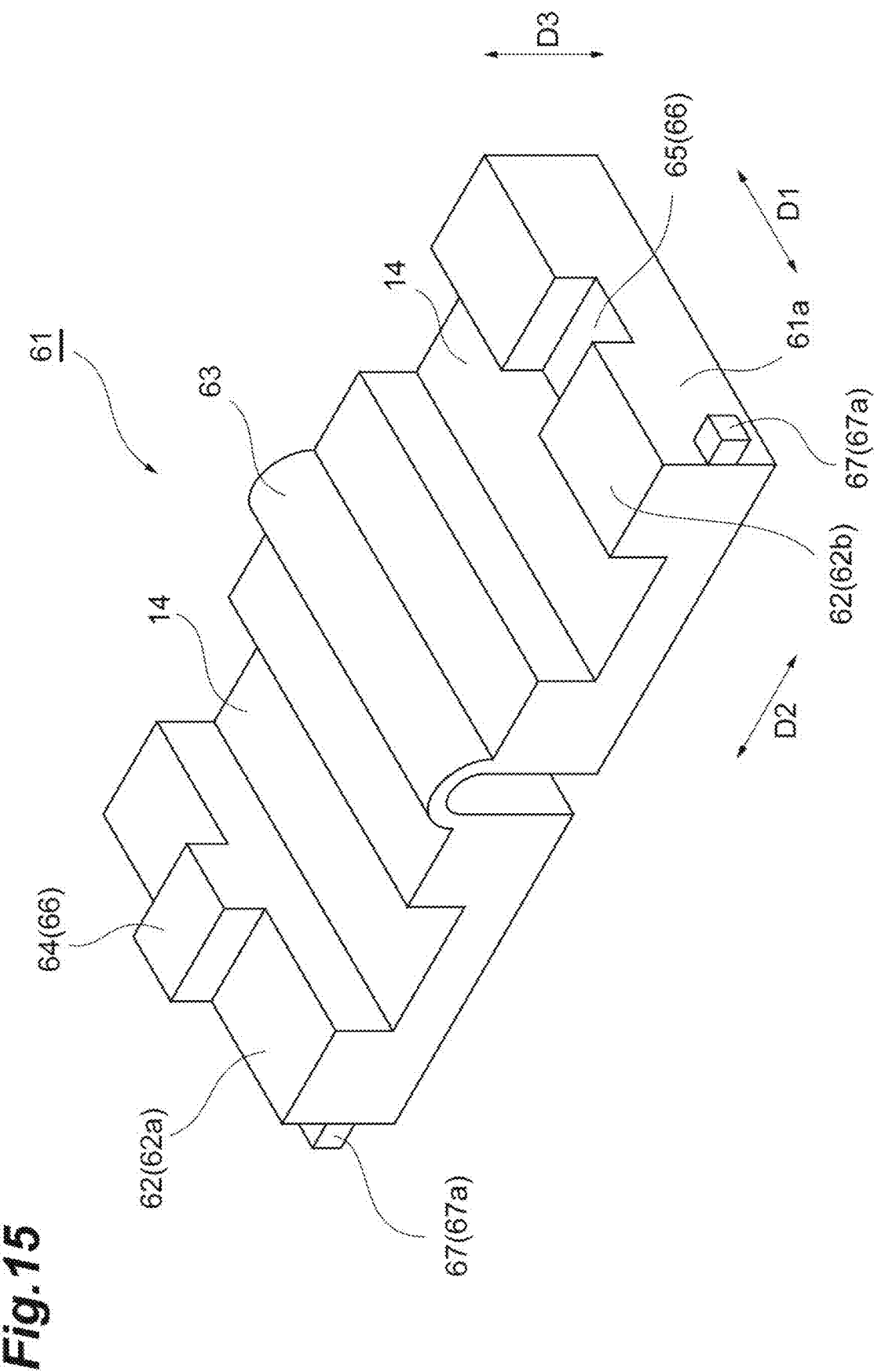
FIG. 15 is a perspective view showing the support member of an optical connector according to a sixth embodiment.
Figure 16:
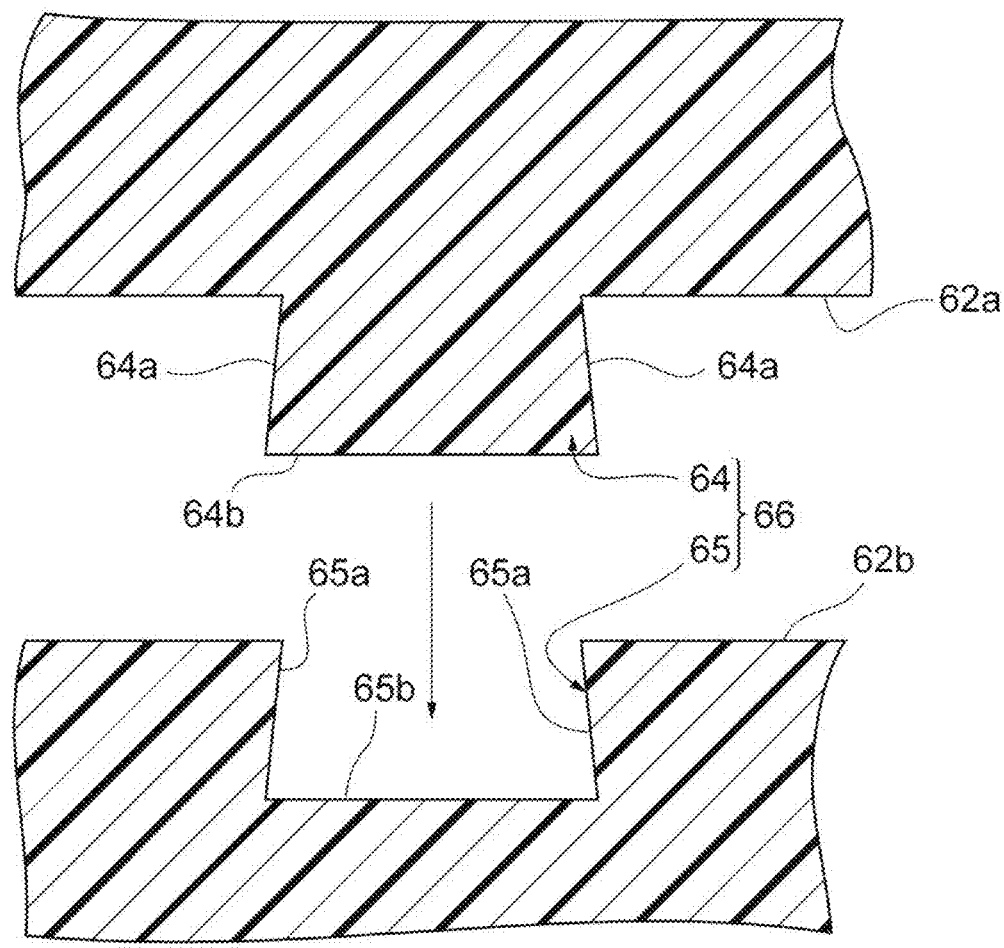
FIG. 16 is a cross sectional view showing the engagement part of the support member of an optical connector according to a seventh embodiment.

Next, referring to FIG. 15 and FIG. 16, an optical connector according to a sixth embodiment will be described. As shown in FIG. 15 and FIG. 16, similarly to the fifth embodiment, the optical connector according to the sixth embodiment includes a rear housing 61. The rear housing 61 is configured of one component. The rear housing 61 includes a hinge 63 configured to open and close a cut 62 extending in the direction intersecting with the connecting direction D1 and a knob part 67. FIG. 15 shows the state in which the cut 62 is opened.

As an example, the cut 62 is provided on both end sides in the direction D2, and the hinge 63 is provided in the center side in the direction D2. The rear housing 61 can open and close the cut 62 about the hinge 63 extending in the connecting direction D1, for example. As an example, a bump 64 is provided on one side face 62a of the cut 62, and a recess 65 is provided on another face 62b of the cut 62. The bump 64 and the recess 65 configure an engagement part 66 configured to keep the cut 62 closed. In this case, the hinge 63 is closed with the optical fibers F placed on an insertion hole 14, the bump 64 is fit into the recess 65, and then the cut 62 is closed.

For example, the knob part 67 includes a pair of bumps 67a provided on outer faces 61a of the rear housing 61 adjacent to the cut 62. In this case, the pair of bumps 67a moves in directions apart from each other with the cut 62 closed, and hence the cut 62 can be easily opened about the hinge 63.

As shown in FIG. 16, the bump 64 may have a pair of inclined planes 64a inclined such that the bump 64 is expanded as the pair of inclined planes 64a is apart from the face 62a and a top face 64b connecting the pair of inclined planes 64a to each other. The recess 65 may have a pair of inclined planes 65a inclined such that the recess 65 is expanded as the pair of inclined planes 65a is apart from the face 62b, for example, and a bottom face 65b connecting the pair of inclined planes 65a to each other.

In this case, the inclined planes 64a contact the inclined planes 65a when the fitting is about to be released with the bump 64 fit into the recess 65, and hence resistance force against releasing the fitting can be provided. Therefore, in the engagement part 66 having the configuration, the bump 64 can be firmly fit into the recess 65. However, the shape and size of the bump 64 and the recess 65 are not limited to the example above, and can be appropriately modified. The configuration of the engagement part 66 is not limited to the configuration having the bump 64 and the recess 65. The configuration can be appropriately modified to any configuration that can keep the state in which the cut 62 is closed.

As described above, in the optical connector according to the sixth embodiment, the rear housing 61 is configured of one component, having the hinge 63 configured to open and close the cut 62. Therefore, similarly to the fifth embodiment, the rear housing 61 is configured of one component, and hence the costs of the rear housing 61 can be reduced. The size of the cut 62 can be freely changed by the hinge 63, and hence the insertion and removal of the optical fibers F into and from the rear housing 61 can be more easily performed.

The rear housing 61 has the engagement part 66 configured to keep the cut 62 closed. Therefore, the cut 62 is closed by the engagement part 66, and hence the cut 62 can be closed with the optical fibers F inserted into the insertion hole 14. Therefore, the possibility that the optical fibers F unintentionally come off from the insertion hole 14 can be reduced.

Seventh Embodiment

Figure 17:
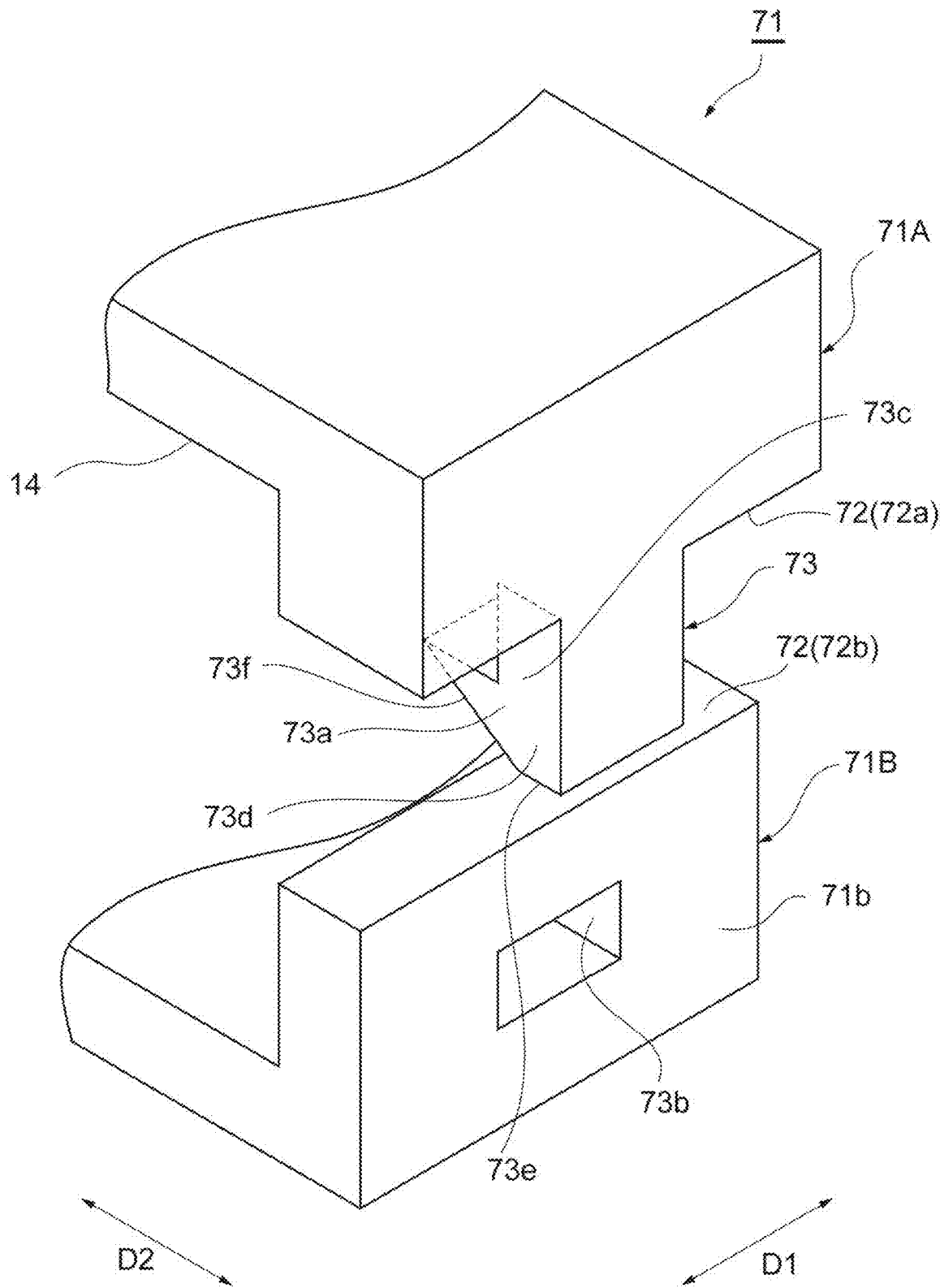
FIG. 17 is a perspective view showing the engagement part of the support member of an optical connector according to an eighth embodiment.
Figure 18:
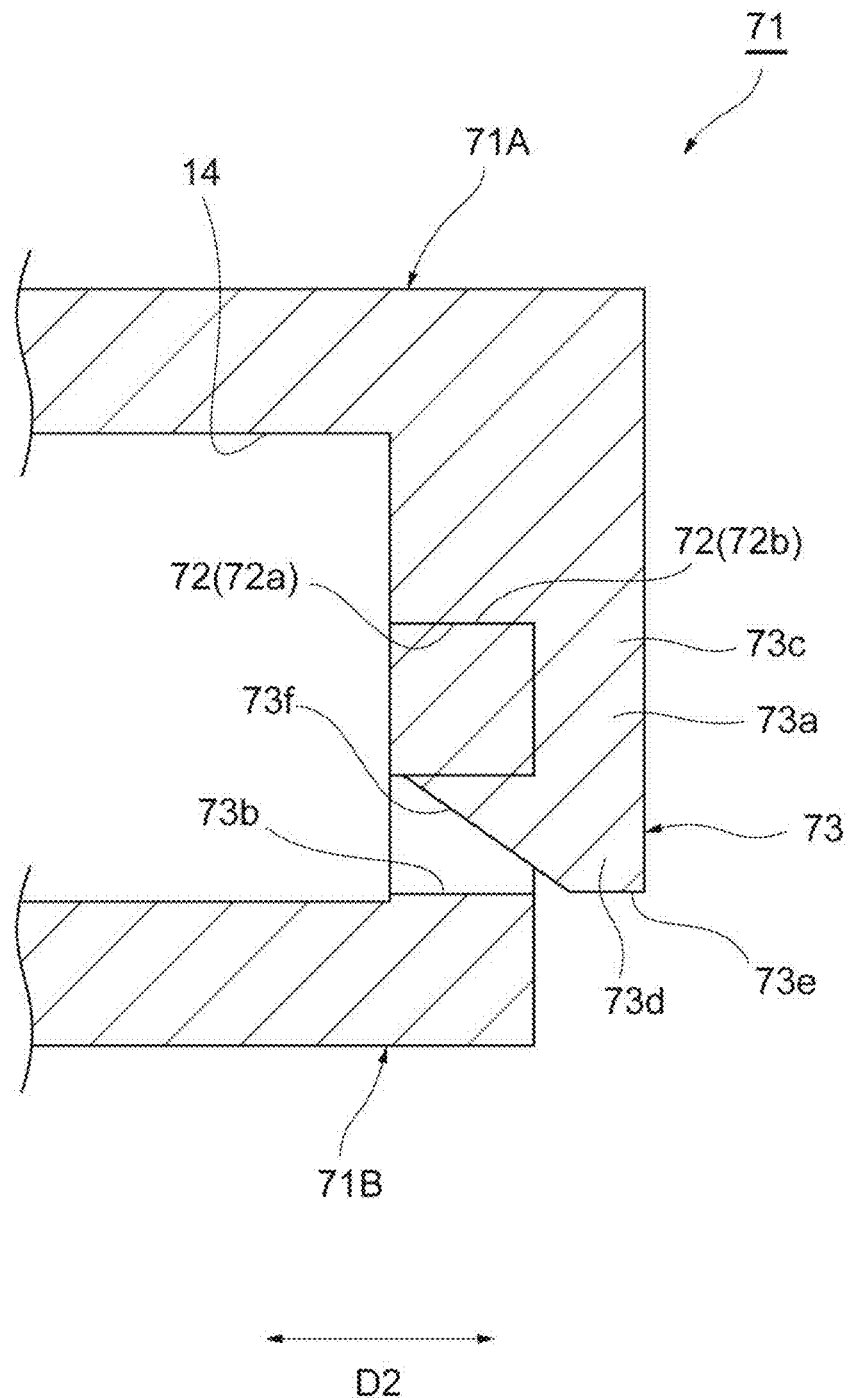
FIG. 18 is a cross sectional view showing the engagement part in FIG. 17.

Next, referring to FIGS. 17 and 18, an optical connector according to a seventh embodiment will be described. As shown in FIGS. 17 and 18, the optical connector according to the seventh embodiment includes a rear housing 71. The rear housing 71 may be configured of one component, or may be configured of a plurality of components. The rear housing 71 includes a first portion 71A and a second portion 71B divided from each other through a cut 72 extending in the direction intersecting with the connecting direction D1 (e.g. in the direction D2).

The rear housing 71 includes a latch structure 73 configured to open and close the cut 72. The latch structure 73 includes an engagement projection 73a protruding from the first portion 71A to the second portion 71B and an engagement hole 73b provided on an outer face 71b of the second portion 71B. For example, the engagement hole 73b is a through hole penetrating the second portion 71B in the direction D2. The engagement projection 73a has a base part 73c protruding from one side face 72a of the cut 72 and an extension part 73d expanding at the protruding end of the base part 73c.

The extension part 73d has a tapered face 73f inclined from a tip end 73e of the engagement projection 73a to the insertion hole 14 side and the face 72a side. When the engagement projection 73a engages with the engagement hole 73b, the tapered face 73f contacts another face 72b on the other side of the cut 72, the engagement projection 73a is expanded to the outer side of the rear housing 71, the extension part 73d is fit into the engagement hole 73b due to the elasticity of a resin, and hence the engagement projection 73a firmly engages with the engagement hole 73b. Note that the configuration of the latch structure 73 is not limited to the structure having the engagement projection 73a and the engagement hole 73b, and the configuration can be appropriately modified to any structure that can keep the cut 72 closed.

As described above, in the optical connector according to the seventh embodiment, the rear housing 71 includes the cut 72 openable and closable, and the latch structure 73 configured to keep the cut 72 closed. Therefore, the cut 72 is firmly closed by the latch structure 73, and hence the cut 72 can be closed with the optical fibers F inserted into the insertion hole 14. Therefore, the possibility that the optical fibers F unintentionally come off from the insertion hole 14 can be more reliably reduced.

As described above, the embodiments of the optical connector and the method of producing an optical connector are described. However, the optical connector and the method of producing an optical connector according to the present application are not limited to the foregoing embodiments, and can be variously modified. For example, in the foregoing embodiments, the optical connector 1 that is an MPO connector is described. However, the optical connector may be a connector, such as an LC connector or SC connector, other than the MPO connector.

In the foregoing embodiments, an example is described in which the support member is the rear housing 10. However, the support member may be any member that supports the elastic body in the inside of the housing, other than the rear housing. The elastic body may be any elastic body, other than the coil spring. Various elastic bodies that can press the ferrule can be used.

What is claimed is:

1. An optical connector comprising:
   an optical fiber extending along a connecting direction;
   a housing in a tubular shape, the housing including a first opening and a second opening directed to one side and another side in the connecting direction;
   a ferrule configured to retain the optical fiber, the ferrule having a light incidence-emission part optically coupled to a corresponding connector;
   a pin keeper configured to retain a guide pin to be inserted into the ferrule;
   an elastic body configured to press the ferrule together with the pin keeper along the connecting direction; and
   a support member fixed with the second opening covered, the support member being configured to support the elastic body in an inside of the housing, wherein
   the support member has an insertion hole into which the optical fiber is insertable from an intersecting direction intersecting with the connecting direction,
   in the inside of the housing, the ferrule, the pin keeper, and the elastic body are movably disposed in turn from the first opening to the second opening in the connecting direction,
   the light incidence-emission part is exposed from the first opening,
   the optical fiber extends from the insertion hole of the support member covering the second opening,
   the support member has a cut extending from an outer edge of the support member to the insertion hole, and
   the support member is configured of one component, and the support member has a hinge configured to open and close the cut.

2. The optical connector according to claim 1, wherein the support member has an engagement part configured to keep the cut closed.

3. The optical connector according to claim 1, wherein the support member is splittable into a plurality of components, and
   the plurality of components individually has an engagement part configured to engage the plurality of components with each other.

4. The optical connector according to claim 1, wherein the elastic body is a plurality of coil springs.

5. The optical connector according to claim 4, wherein the support member has a plurality of grooves on one side in the connecting direction, and
   the plurality of coil springs is individually fit into the plurality of grooves.

6. The optical connector according to claim 4, wherein the support member has a plurality of projections on one side in the connecting direction, and
   the plurality of coil springs is individually fit into the plurality of projections.

7. The optical connector according to claim 4, wherein at least any one of a spring constant and a spring length of the plurality of coil springs is different from each other.

8. A method of producing the optical connector according to claim 1, the method comprising:
   a first process of mounting the optical fiber on the ferrule; and
   a second process of inserting the optical fiber into the insertion hole of the support member, wherein
   the second process is performed after the first process.

* * * * *